(12) United States Patent
Dy et al.

(10) Patent No.: US 11,873,246 B2
(45) Date of Patent: Jan. 16, 2024

(54) GLASS-CONTAINING PSEUDO-REFERENCE ELECTRODE FOR USE IN ION-SELECTIVE ELECTRODE SENSORS AND ION SELECTIVE FIELD-EFFECT TRANSISTORS

(71) Applicant: NATIONAL RESEARCH COUNCIL OF CANADA, Ottawa (CA)

(72) Inventors: Eben Dy, Richmond (CA); Wei Qu, Vancouver (CA); Zhong Xie, Delta (CA); Jun Shen, Richmond (CA); Kidus Y Tufa, New Westminster (CA)

(73) Assignee: NATIONAL RESEARCH COUNCIL OF CANADA

( * ) Notice: Subject to any disclaimer, the term of this patent is extended or adjusted under 35 U.S.C. 154(b) by 23 days.

(21) Appl. No.: 17/658,366

(22) Filed: Apr. 7, 2022

(65) Prior Publication Data

US 2022/0332631 A1 Oct. 20, 2022

Related U.S. Application Data

(60) Provisional application No. 63/201,042, filed on Apr. 9, 2021.

(51) Int. Cl.
*B32B 17/06* (2006.01)
*B32B 15/04* (2006.01)
(Continued)

(52) U.S. Cl.
CPC ............... *C03C 3/321* (2013.01); *C03C 3/12* (2013.01); *C03C 3/32* (2013.01); *C03C 3/323* (2013.01);
(Continued)

(58) Field of Classification Search
CPC ............................... C03C 3/321; C03C 3/323
(Continued)

(56) References Cited

U.S. PATENT DOCUMENTS 3,853,731 A * 12/1974 Gray ...................... G01N 27/36
29/25.03
4,282,079 A 8/1981 Chang et al.
(Continued)

FOREIGN PATENT DOCUMENTS

EP 1193495 B1 4/2012
EP 1673617 B1 4/2018
(Continued)

OTHER PUBLICATIONS

M. Vaclavikova, K. Vitale, G. P. Gallios and L. Ivanikova, "Water treatment technologies for the removal of high-toxicity pollutants", Springer-Verlag, Berlin (2008).
(Continued)

*Primary Examiner* — Lauren R Colgan
(74) *Attorney, Agent, or Firm* — LAVERY, DE BILLY, LLP; Isabelle Pelletier

(57) ABSTRACT

A pseudo-reference electrode comprising a pseudo-reference glass material backed by a silver conductor comprising silver metal, wherein the pseudo-reference glass material is a chalcogenide glass comprising a silver chalcogenide Ag2Ch, wherein Ch denotes a chalcogen, or a halide glass comprising a silver halide and at least one glass-forming oxide of a metal or a metalloid, a mixture of two or more of these glasses, or a composite of at least one of these glasses. This pseudo-reference electrode can be used in ion-selective electrode (ISE) sensors and ion-selective field effect transistors (ISFETs).

20 Claims, 8 Drawing Sheets

(51) Int. Cl.
   *C03C 3/32*    (2006.01)
   *G01N 27/30*   (2006.01)
   *G01N 27/36*   (2006.01)
   *C03C 3/12*    (2006.01)
   *C03C 4/18*    (2006.01)
   *G01N 27/414*  (2006.01)

(52) U.S. Cl.
   CPC ............... *C03C 3/325* (2013.01); *C03C 4/18* (2013.01); *G01N 27/301* (2013.01); *G01N 27/36* (2013.01); *G01N 27/414* (2013.01)

(58) Field of Classification Search
   USPC .................................................. 428/432, 434
   See application file for complete search history.

(56) References Cited

U.S. PATENT DOCUMENTS

| | | | |
|---|---|---|---|
| 4,437,969 | A | 3/1984 | Covington et al. |
| 5,464,511 | A | 11/1995 | Vlasov et al. |
| 6,398,931 | B1 | 6/2002 | Burchette et al. |
| 9,874,539 | B2 | 1/2018 | Hu et al. |
| 2001/0032785 | A1 | 10/2001 | Cha et al. |
| 2004/0163949 | A1 | 8/2004 | Sorensen et al. |
| 2014/0054492 | A1* | 2/2014 | Mukai ............... H01M 10/0525 429/231.95 |

FOREIGN PATENT DOCUMENTS

| | | |
|---|---|---|
| GB | 2550959 A | 12/2017 |
| IN | 201917046329 A | 1/2020 |

OTHER PUBLICATIONS

S. Dashti, K. Healey, Y. Iman, N. Wright, E. Plate and M. Zimmer, "Mid-Columbia Physical Habitat Monitoring Project: Implementation Year 9", Reference: CLBMON—15a, BCHydro report (2015).

"Continuous Water-Quality Sampling Programs: Operating Procedures, Watershed and Aquifer Science", Science and Information Branch, B.C. Ministry of Environment for the Resources Information Standards Committee, Government Publication Services, Victoria, BC.

United States Geological Services, "Continuous Water Quality Monitoring Network" Website. https://www.usgs.gov/centers/nebraska-water-science-center/science/continuous-water-quality-monitoring-network?amp%3Bqt-science_center_objects=0>-science=#qt-science_center_objects.

Thiago V. Moreno, Luis C. Malacame, Mauro L. Baesso, Wei Qu, Eben Dy, Zhong Xie, Jason Fahlman, Jun Shen, Nelson G.C. Astrath, "Potentiometric sensors with chalcogenide glasses as sensitive membranes: A short review", Journal of Non-Crystalline Solids, vol. 495, 2018, 8-18, https://doi.org/10.1016/j.jnoncrysol.2018.04.057.

M.C.R. Shastry and K.J. Rao, "A Chemical Approach to an understanding of the Fast Ion Conduction in Silver Iodide-Silver Oxysalt Glasses", Solid State Ionics, 37, 1989, 17-29.

Bakker and Qin, "Electrochemical Sensors", Anal Chem. Jun. 15, 2006; 78(12): 3965-3984. doi:10.1021/ac060637m.

"Overview of Reference Electrodes and Alternative Reference Electrodes" Brief Discussion about Standard and Pseudo Reference Electrodes, Pine Research Instrumentation, , Document #: DRK10053 (REV001 | Apr. 2016), pp. 1-12.

Ghosh et al., "All-Solid-State Sodium-Selective Electrode with a Solid Contact of Chitosan/Prussian Blue Nanocomposite", Sensors 2017, 17(11), 2536; https://doi.org/10.3390/s17112536.

Komoda et al., "Instantaneously usable screen-printed silver/silver sulfate reference electrode with long-term stability", Electrochemistry Communications, vol. 103 (2019), pp. 133-137.

* cited by examiner

FIG. 1 – PRIOR ART

GLASS-CONTAINING PSEUDO-REFERENCE ELECTRODE FOR USE IN ION-SELECTIVE ELECTRODE SENSORS AND ION SELECTIVE FIELD-EFFECT TRANSISTORS

CROSS REFERENCE TO RELATED APPLICATIONS

This application claims benefit, under 35 U.S.C. § 119(e), of U.S. provisional application Serial No. 63/201,042, filed on Apr. 9, 2021. All documents above are incorporated herein in their entirety by reference.

FIELD OF THE INVENTION

The present invention relates to a pseudo-reference electrode containing a glass material. More specifically, the present invention is concerned with the use of this pseudo-reference electrode in ion-selective electrode sensors and ion selective field-effect transistors.

BACKGROUND OF THE INVENTION

One of the most common public concerns regarding mining, oil sands operations, and dam/road construction industry is water contamination. Indeed, this is a major environmental problem. When the earth's surface is disturbed, minerals that were once hidden from air and water become subject to weathering. Blasting and digging creates small particles from what were once one big pieces of rock, thereby vastly increasing available exposed surfaces for chemical reaction. During rain fall and snow melts, these disturbed surfaces can leach off elevated levels of acidity, salinity and toxic elements. Long-term water treatment and quality monitoring is required for such environments.

The current quality monitoring practice is periodic grab sampling of water, which is sent to a laboratory for complete analysis. Periodic on-site measurements of certain parameters are also commonly performed with portable equipment. This process is expensive, and sampling during bad weather or in remote areas poses a safety risk to field personnel. Furthermore, periodic sampling can miss short-term or sudden spikes in concentration of hazardous chemical species that can happen, for example, during freshets.

A limited number of water quality parameters, e.g. temperature, dissolved oxygen, pH, ORP, conductivity (dissolved solids), chlorophyll type-A, turbidity (suspended solids), nitrates, and fluorescent dissolved organic matter, can currently be measured by remote on-line equipment.

Recent advances in wireless communications technology and applying Internet-of-Things (IoT) makes continuous remote sensing and monitoring more practical. However, this technology is limited by the sensors available for different water quality parameters.

Continuous online monitoring of water chemistry still requires high levels of intervention. Periodic checks are required for quality assurance purposes. Weekly, bi-weekly or triweekly visits to the site are required to maintain and validate sensor performance depending on how much bad data one can afford.

Many ion-selective electrodes (ISEs) can be used with portable field equipment to selectively measure ions such as $Cl^-$, $Ca^{2+}$, $Na^+$, $Cu^{1+\ or\ 2+}$, etc. However, these have not found their way into remote continuous real-time monitors. This is due to storage, maintenance, and conditioning requirements of the electrodes, which make them difficult to implement in continuous remote applications.

Ion-selective electrode (ISE) analysis is an analytical technique used to determine the activity of ions in aqueous solution by measuring the electrical potential. ISE has wide variety of applications. For example, ISE finds its use in pollution monitoring in natural waters ($CN^-$, $F^-$, $S^-$, $Cl^-$, etc.), food processing ($NO_3^-$, $NO_2^-$ in meat preservatives), $Ca^{2+}$ in dairy products, and $K^+$ in fruit juices, etc.

An ISE is a sensor composed of two electrodes: the ion sensing half-cell and reference half-cell electrodes. ISE working electrodes are available for many elements. They need to be conditioned in a specific liquid prior to use. The ion sensing electrodes are paired to a reference electrode. The reference electrodes of choice used in commercial ISEs are the Saturated Calomel Electrode (SCE) and the Silver/Silver chloride (Ag|AgCl) electrode. These reference electrodes need to be maintained in an aqueous solution, which makes them impractical for unattended use.

SUMMARY OF THE INVENTION

In accordance with the present invention, there is provided:

1. A pseudo-reference electrode comprising a pseudo-reference glass material backed by a silver conductor comprising silver metal,
   wherein the pseudo-reference glass material is:
   a chalcogenide glass comprising a silver chalcogenide $Ag_2Ch$, wherein Ch denotes a chalcogen, or
   a halide glass comprising a silver halide and at least one glass-forming oxide of a metal or a metalloid,
   a mixture of two or more of these glasses, or
   a composite of at least one of these glasses.
2. The pseudo-reference electrode of embodiment 1, wherein the chalcogenide glass further comprises an arsenic chalcogenide $As_2Ch_3$, wherein Ch denotes a chalcogen; preferably in a Ag:As molar ratio from about 0.25:0.75 to about 0.50:0.50, and most preferably of about 0.34:0.66.
3. The pseudo-reference electrode of embodiment 2, wherein the chalcogenide glass is a $Ag_2S$—$As_2S_3$, $Ag_2S$—$Ag_2Te$—$As_2S_3$, $Ag_2S$—$As_2S_3$—$AgI$, or $Ag_2S$—$As_2S_3$—$AgBr$ glass.
4. The pseudo-reference electrode of any one of embodiments 1 to 3, wherein the chalcogenide glass comprises two silver chalcogenides.
5. The pseudo-reference electrode of embodiment 4, wherein the chalcogenide glass is $Ag_2S$—$Ag_2Se$ is $Ag_2Se$—$Ag_2Te$—$As_2Se_3$ glasses, preferably wherein the total mole ratio of the silver chalcogenides in the chalcogenide glass is from about 0.2 to about 0.5.
6. The pseudo-reference electrode of any one of embodiments 1 to 5, wherein the chalcogenide glass further comprises a germanium chakogenide GeCh, wherein "Ch" denotes a chalcogen, preferably in a $Ag_2Ch$:GeCh molar ratio is from about 0.2:0.8 to about 0.5:0.5.
7. The pseudo-reference electrode of embodiment 6, wherein the chalcogenide glass is a $Ag_2Se$—GeSe or $Ag_2S$—GeS glass.
8. The pseudo-reference electrode of any one of embodiments 1 to 7, wherein the chalcogenide glass further comprises a silver halide, preferably in a $Ag_2Ch$:Ag halide molar ratio from about 0.4 to about 0.7.
9. The pseudo-reference electrode of embodiment 8, wherein the silver halide is silver iodide or silver bromide.
10. The pseudo-reference electrode of embodiment 8 or 9, wherein the chalcogenide glass is a $Ag_2S$—$As_2S_3$—AgI or $Ag_2S$—$As_2S_3$—AgBr glass.

11. The pseudo-reference electrode of any one of embodiments 1 to 10, wherein the chalcogenide glass is a $Ag_2S$—$As_2S_3$, $Ag_2S$—$Ag_2Se$, $Ag_2Se$—$GeSe$, $Ag_2S$—$As_2S_3$—$AgI$, $Ag_2S$—$As_2S_3$—$AgBr$, $Ag_2S$—$GeS$, or $Ag_2Se$—$Ag_2Te$—$As_2Se_3$ glass, preferably a $Ag_2$—$As_2S_3$ or $Ag_2S$—$Ag_2Se$ glass, more preferably a $Ag_2S$—$As_2S_3$ glass, yet more preferably a $(Ag_2S)_{0.3-0.4}(As_2S_3)_{0.6-0.7}$ glass, and most preferably $(Ag_2S)_{0.34}(As_2S_3)_{0.66}$.

12. The pseudo-reference electrode of any one of embodiments 1 to 11, wherein the chalcogen(s) is(are) selected from the group consisting of S, Se, and Te, preferably S and Se, and most preferably is(are) S.

13. The pseudo-reference electrode of any one of embodiments 1 to 12, wherein the silver halide in the halide glasses is silver fluoride, silver chloride, silver bromide, or silver iodide, preferably silver iodide.

14. The pseudo-reference electrode of any one of embodiments 1 to 13, wherein the halide glass comprises silver oxide and at least one other glass-forming oxide of metal/metalloid.

15. The pseudo-reference electrode of embodiment 14, wherein a silver oxide: other glass-forming oxide(s) of metal/metalloid molar ratio in the halide glass is from about 0.2-0.8 to about 0.2-0.8, and preferably from about 0.50.5 to about 0.75:0.25, and most preferably either about 0.5:0.5 or about 0.75:0.25.

16. The pseudo-reference electrode of any one of embodiments 1 to 16, wherein a silver halide: total glass-forming oxide(s) of metal/metalloid in the halide glass is from about 0.4:0.6 to about 0.7:0.3, and most preferably about 0.6:0.4.

17. The pseudo-reference electrode of any one of embodiments 1 to 16, wherein the glass-forming oxide(s) of metal/metalloid is(are) $AgO$, $P_2O_5$, $VO_3$, $CrO_2$, $SiO_2$, $SnO_2$, $PbO_2$, $MoO_4$, and/or $WO_4$, preferably $AgO$, $P_2O_5$, $MoO_4$, and/or $WO_4$, and most preferably $AgO$, $MoO_4$, and/or $WO_4$.

18. The pseudo-reference electrode of any one of embodiments 1 to 17, wherein the halide glass is:
    $AgI$—$Ag_2O$—$MoO_3$, preferably $AgI_x(Ag_2O)_y(MoO_3)_z$, and most preferably $AgI_{0.60}(Ag_2O)_{0.20}(MoO_3)_{0.20}$;
    $AgI$—$Ag_2O$—$P_2O_5$, preferably $AgI_x(Ag_2O)_y(P_2O_5)_z$, and most preferably $AgI_{0.60}(Ag_2O)_{0.30}(P_2O_5)_{0.10}$; or
    $AgI$—$Ag_2O$—$WO_3$, preferably $AgI_x(Ag_2O)_y(WO_3)_z$, and most preferably $AgI_{0.60}(Ag_2O)_{0.20}(WO_3)_{0.20}$,
    wherein x, y, and z are molar ratios, wherein x varies from about 0.4 to about 0.7, y varies from about 0.08 to about 0.56 and z varies from about 0.08 to about 0.56.

19. The pseudo-reference electrode of any one of embodiments 1 to 18, wherein the composite comprises:
    at least one chalcogenide glass or halide glass and binder, or
    at least one chalcogenide glass or halide glass, a binder, and an electrically conductive carbon allotrope.

20. The pseudo-reference electrode of embodiment 19, wherein the binder is a polymeric binder.

21. The pseudo-reference electrode of embodiment 19 or 20, wherein the binder is electrically conducting.

22. The pseudo-reference electrode of embodiment 19 or 20, wherein the binder is electrically non-conducting.

23. The pseudo-reference electrode of any one of embodiments 19 to 22, wherein the binder is:
    a fluorine-containing polymer, such poly(vinylidene difluoride) (PVDF),
    poly(tetrafluoroethylene),
    carboxymethylcellulose,
    a styrene butadiene rubber,
    an acrylic polymer, such as poly(acrylic acid),
    an alginates, such as sodium alginate,
    a polyurethanes,
    an epoxy,
    poly(vinyl chloride) (PVC),
    petroleum jelly,
    a gums, such as Tragacanth gum,
    a starches, such as Tapioca starch,
    sodium carboxymethyl chitosan,
    chitosan sulfate ethylamide glycinamide,
    poly(methyl vinyl ether-alt-lithium maleic acid),
    supramolecular lithiated perylene bisimide,
    poly (3,4-ethylenedioxythiophene)
    poly(3,4-ethylenedioxythiophene) (PEDOT),
    poly(styrenesulfonate) (PSS),
    polyethylenimine (PEI),
    polypyrrole (PPY),
    poly(p-phenylene) (PPP),
    polythiophene (PT), or
    polyanilline (PANI);
    preferably epoxy or PVC.

24. The pseudo-reference electrode of any one of embodiments 19 to 23, wherein the electrically conductive carbon allotrope is graphite, AA'-graphite, graphene, graphenylene, fullerenes, carbon nanotubes, carbon nanobuds, schwarzites, amorphous carbon, Q-carbon, carbon black, cyclocarbon, glassy carbon, or carbide-derived carbon (CDC); preferably graphite or glassy carbon, and more preferably graphite.

25. The pseudo-reference electrode of any one of embodiments 19 to 24, wherein the composite comprises both the binder and the electrically conductive carbon allotrope.

26. The pseudo-reference electrode of any one of embodiments 19 to 25, wherein the composite comprises a thermoset polymer and the electrically conductive carbon allotrope, preferably graphite.

27. The pseudo-reference electrode of any one of embodiments 1 to 26, wherein the pseudo-reference glass material is in the form of pellets or films.

28. The pseudo-reference electrode of any one of embodiments 1 to 27, wherein the silver conductor is supported on an electrically insulating substrate preferably polypropylene, acrylonitrile butadiene styrene (ABS), polyphenylene sulfide (PPS, e.g. from Ryton®), epoxy, polyvinyl chloride (PVC), alumina, corundum, borosilicate, silica, or another silica-based glass.

29. The pseudo-reference electrode of any one of embodiments 1 to 28 for use as a reference electrode, 30. The pseudo-reference electrode of any one of embodiments 1 to 28 for use as a reference electrode in a reference half-cell of an ion-selective electrode (ISE) sensor.

31. Use of a pseudo-reference electrode of any one of embodiments 1 to 28 as a reference electrode in a reference half-cell of an ion-selective electrode (ISE) sensor.

32. Use of a pseudo-reference glass material as defined in any one of embodiments 1 to 18 in a pseudo-reference electrode, preferably a reference half-cell of an ion-selective electrode (ISE) sensor 33. A reference half-cell of ion-selective electrode (ISE) sensor comprising the pseudo-reference electrode of any one of embodiments 1 to 28.

34. An ion-selective electrode (ISE) sensor comprising the reference half-cell of the invention of embodiment 33, a sensing half-cell and a voltmeter; the reference half-cell and the sensing half-cell being connected to the voltmeter.

35. The pseudo-reference electrode of any one of embodiments 1 to 28 for use as a reference electrode in an ion-selective field effect transistor (ISFET).
36. Use of a pseudo-reference electrode of any one of embodiments 1 to 28 as a reference electrode in an ion-selective field effect transistor (ISFET).
37. Use of a pseudo-reference glass material as defined in any one of embodiments 1 to 18 in a pseudo-reference electrode, preferably in an ion-selective field effect transistor (ISFET).
38. An ion-selective field effect transistor (ISFET) comprising the pseudo-reference electrode of any one of embodiments 1 to 28.
39. The pseudo-reference electrode, use, reference half-cell, ion-selective electrode (ISE) sensor and ion-selective field effect transistor of any one of embodiments 30 to 35, wherein the pseudo-reference electrode is free of an element to be analyzed by the ISE sensor or the ISFET.

BRIEF DESCRIPTION OF THE DRAWINGS

In the appended drawings.

DETAILED DESCRIPTION OF THE INVENTION

Turning now to the invention in more details, there is provided a pseudo-reference electrode.
The pseudo-reference electrode of the invention can be advantageously used as a reference electrode in a reference half-cell of an ion-selective electrode (ISE) sensor.
Herein, the term "ion-selective electrode sensor" or "ISE sensor" refers an electrochemical sensor composed of a sensing half-cell and a reference half-cell, both connected to a voltmeter. When both half-cells are immersed in a sample solution, the voltage measured will selectively be proportional to the concentration of an ion to be measured in the sample solution.

Figure 1:
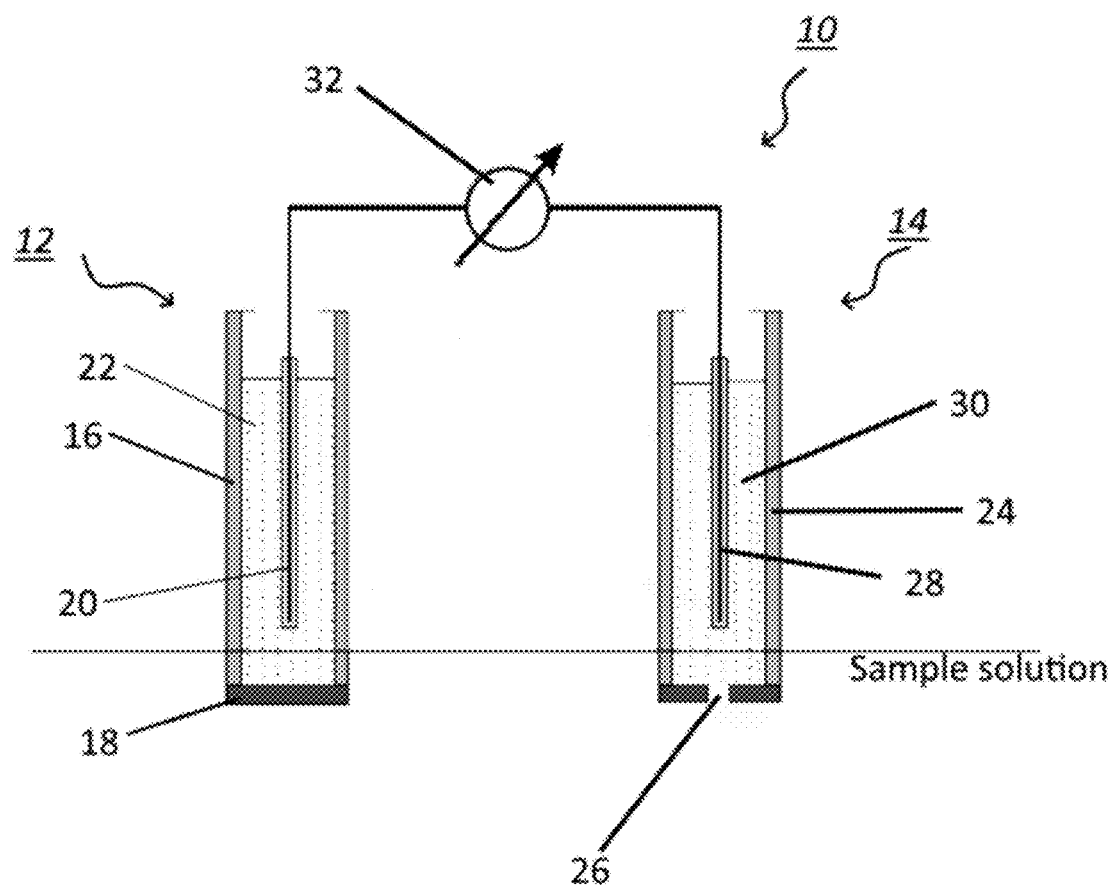
FIG. 1 is a scheme of a conventional ISE sensor (10).

FIG. 1 is a scheme of a conventional ISE sensor (10). The ISE sensor comprises a sensing half-cell (12), which is ion-selective, and a reference half-cell (14), both intended, when in use, to be at least partially immersed within a sample solution containing ions to be measured so the ion-selective membrane (18) and liquid junction (26) are immersed in the sample solution. Both the sensing half-cell (12) and the reference half-cell (14) are connected to a voltmeter (32). Typically, the voltmeter (32) is a sensitive milli-voltmeter connected to the sensing half-cell (12) and the reference half-cell (14) by low-noise cables and connectors. Measurement is accomplished simply by immersing the two half-cells (12, 14) in the sample solution as shown in FIG. 1. The measured voltage is proportional to the logarithm of the activity (effective concentration) of the ions measured in the sample solution.

The sensing half-cell (12) typically comprises a body (16) made of a non-conductive material and equipped with an ion-selective membrane (18). The ion-selective membrane (18) is intended to be in contact with the sample solution and to allow the ions to be measured to pass while preventing the passage of all other ions. Within the container (16) of the sensing half-cell (12), there is a reference electrode (20) bathing in a standard electrolyte (22) containing a known concentration of the ions to be measured.

The potential of the sensing half-cell (12) can only be measured against a suitable reference half cell (14) in contact with the same test solution. The reference half-cell (14) is an electrochemical half cell whose potential is constant thanks to the chemical equilibria maintained inside it.

The reference half-cell (14) typically comprises a body (24) made of a non-conductive material and equipped with a liquid junction (26), such as a frit or a sintered glass. Within the body (24), there is a reference redox couple, also called the reference electrode, (e.g., Ag coated with AgCl) (28) bathing in a conditioning electrolyte (30) that is free of the ions to be measured. In use, the liquid junction (26) is in contact with the sample solution and allows the transfer of ions between the sample solution and the conditioning electrolyte (30), while preventing the corruption of the sample solution and the conditioning electrolyte (30) that would result if the conditioning electrolyte (30) was allowed into the sample solution and vice versa.

It should be noted that some documents refer to the sensing half-cell (12) as the sensing electrode, working electrode, or the ion-selective electrode. Similar, the reference half-cell (14) is also called the reference electrode. Moreover, whole ISE sensors as described above are also colloquially called ion-selective electrodes.

Further, the combination of reference electrode (20) and the standard electrolyte (22) is often called a "reference system". Similarly, the combination of reference electrode (28) and the conditioning electrolyte (30) is also often called a "reference system".

The sensing half-cell (12) and the reference half-cell (14) can be separate from one another or both encased inside a single body to form a so-called combination electrode.

To avoid confusion, it should be noted that, in a combination electrode, the reference electrode (20) in the sensing half-cell (12) is often called the inner (or internal) reference electrode, while the reference electrode (28) in the reference half-cell (14) is called the outer (or external) reference electrode.

As noted in the background section above, conventionally, the reference electrodes (20, 28) of choice are the Saturated Calomel Electrode (SCE) and the silver/silver chloride (Ag/AgCl) electrode (typically a silver wire coated with solid silver chloride).

Silver/silver chloride electrodes need to be maintained in an aqueous solution (typically a concentrated aqueous potassium chloride solution saturated with silver chloride). In such cases, the standard electrolyte (22) and/or the conditioning electrolyte (30), as the case may be, are concentrated aqueous potassium chloride solutions saturated with silver chloride (with the standard electrolyte (22) further containing a known concentration of the ions to be measured).

Saturated Calomel Electrode also needs to be maintained in an aqueous solution (typically a saturated aqueous potassium chloride solution). In such cases, the standard electrolyte (22) and/or the conditioning electrolyte (30), as the case may be, are saturated aqueous potassium chloride solution (with the standard electrolyte (22) further containing a known concentration of the ions to be measured).

Of course, many other outer standard electrolytes are known. Furthermore, the sensing half-cell (12) can be all solid, i.e. so-called Solid-State Ion-selective Electrodes (SS-ISE) as well-known to the skilled person.

Pseudo-Reference Electrode of the Invention

In one aspect of the invention, there is provided a pseudo-reference electrode. This pseudo-reference electrode is meant to replace conventional reference electrodes in reference half-cells in ISE sensors or ion-selective field effect transistors (ISFETs). More specifically, it can be used in the ISE sensor variants described above as well as those otherwise known to the skilled person.

The pseudo-reference electrode of the invention comprises a pseudo-reference glass material backed by a silver conductor. The pseudo-reference glass material and the silver conductor are in direct contact with one another. The silver conductor comprises silver metal. This generates a stable electrochemical potential at the glass material/silver conductor interface, which will be the reference voltage when in use.

The pseudo-reference glass material is:
1. a chalcogenide glass comprising a silver chalcogenide $Ag_2Ch$, wherein Ch denotes a chalcogen, or
2. a halide glass comprising a silver halide and at least one glass-forming oxide of a metal or a metalloid,
a mixture of two or more of these glasses, or
a composite of at least one of these glasses.

The pseudo-reference glass material is a semiconductor, silver-based, and ion-conducting.

The invention also relates to the use of the pseudo-reference glass material in a pseudo-reference electrode, particularly in such an electrode in a reference half-cell of an ISE sensors In researching glasses that could be advantageously used in the sensing half-cell of an ISE sensor, the present inventors noticed that the above glasses were unexpectedly stable (had a stable potential) even in the presence of varying concentrations of various ions—see the Example section below. This led the inventors to surmise that these glasses would be useful in reference electrodes. Indeed, a good reference electrode produces an output voltage that is very stable.

In contrast with glasses used as ion-selective membranes in the sensing half-cells of ISE sensors, the glass pseudo-reference electrode of the invention is free of an element to be analyzed by an ISE sensor containing the pseudo-reference electrode. Therefore, if the pseudo-reference electrode of the invention is intended for use in an ISE sensor to detect fluoride ions, the glass in the pseudo-reference electrode will be free of fluoride. The glasses used as ion-selective membranes in the sensing half-cells of ISE sensors are necessarily doped with the element to be analyzed by an ISE sensor.

For more clarity:

The pseudo-reference electrode of the invention is not meant to be part of the sensing half-cell of an ISE sensor.

The pseudo-reference electrode of the invention and the pseudo-reference glass material are not meant to be in contact or be connected to the ion-selective membrane of an ISE sensor in any way, except for the fact that the pseudo-reference electrode and the sensing half-cell are, in use, both at least partially immersed in a sample solution so the ion-selective membrane and at least part of the pseudo-reference glass material are immersed in the sample solution, and both connected to the voltmeter.

The pseudo-reference electrode of the invention and the pseudo-reference glass material are not meant to be part of a solid junction between the ion-selective membrane and the internal reference electrode in a sensing half-cell of an ISE sensor.

Furthermore, unlike the Saturated Calomel Electrode and the/AgCl Reference electrode, which must be stored in saturated chloride solutions, the pseudo-reference electrode of the invention does not need to be kept in conditioning electrolyte when stored. Indeed, the above glasses/electrodes are stable whether stored wet or dry.

In addition, the above glasses and the pseudo-reference electrode of the invention are not adversely affected by the conditioning electrolyte used for the ion-sensing half-cell in an ISE sensor. While long term storage in such conditioning electrolyte can cause a slow drift in its half-cell potential (mV), this potential was nevertheless found to be stable for the duration of the calibration and actual measurement cycles.

The pseudo-reference glass material can be exposed to the environment. While not in use, it can safely be in contact with the air. In use, namely in an ion-selective electrode sensor, the pseudo-reference glass material can be in contact with the sample solution to be analyzed, without being shielded in a body equipped with a liquid junction and filled with conditioning electrolyte.

Thus, a further advantage of the pseudo-reference electrode of the invention, when in use in an ISE sensor, is that it does not need a liquid junction (frit/sintered glass). This is advantageous as such junctions in conventional reference electrodes can become plugged with drying conditioning electrolyte. This is problem is avoided by using the electrode of the invention.

Moreover, since the pseudo-reference electrode of the invention do not need conditioning and storage electrolytes, it requires much less maintenance than conventional reference electrodes. This means they can be used in conditions where regular maintenance is difficult, for example during bad weather or in remote areas that could pose a safety risk to maintenance personnel. Hence, the pseudo-reference electrode of the invention is suited for use in e.g. remote areas for continuous, unattended environmental water quality monitoring.

Yet another advantage of the pseudo-reference electrode of the invention is that the presence of silver (and arsenic in some cases) in the glass is expected to help preventing biofouling of the ISE sensor surface.

Finally, the pseudo-reference electrode of the invention is expected to have a lower cost than conventional reference electrodes.

As noted above, a reference electrode is an electrode which has a highly stable and well-known electrode potential. In contrast, pseudo-reference electrodes do not maintain a perfectly constant potential but rather their potential may vary predictably in certain conditions. For example, their potential could be affected by certain interfering species (such as ions). The use of a pseudo-reference electrodes like the pseudo-reference electrode of the invention is nevertheless appropriate in ISE sensors, since the main requirement is that the pseudo-reference electrode must be more stable than the sending electrode.

Herein, a "glass-forming" element or compound is an element or compound which has the ability to form a glass, i.e., the ability to form bonds which lead to a vitreous network, either alone or when combined with other "glass-forming" elements or compounds. Such elements and or compounds are well known to the skilled person.

For example, in general, it is well-known that the chalcogens S, Se, and Te form glasses alone (monatomic or primary glasses) as well as mixed with one another or with elements of Groups 13, 14, and 15 of the periodic table as well as with silver (binary glasses). Such glasses are typically referred to in the art as chalcogenide glasses. Furthermore, binary glasses are also known to exist composed of an element of Group 17 (F, Cl, I, or Br) and one or more elements of Groups 2-14 of the periodic table. Such glasses are typically referred to in the art as halide glasses.

In a similarly manner, herein, the family of glasses number 1 above, i.e., the glasses comprising a silver chalcogenide, are referred to herein as "chalcogenide glasses". Also, the family of glasses number 2 above, i.e., the glasses comprising a silver halide and at least one glass-forming oxide of a metal or a metalloid, are referred to herein as "halide glasses".

Herein, "chalcogens" are elements of Group 16 of the periodic table that are capable of forming glasses. These elements include S, Se, and Te, i.e., all the elements of Group 16 of the periodic table except oxygen and the highly radioactive Po and Lv. Preferred chalcogens include S and Se. A most preferred chalcogen is S.

In embodiments, the chalcogenide glass further comprises an arsenic chalcogenide. In preferred such embodiments, the Ag:As molar ratio is from about 0.25:0.75 to about 0.50:0.50, and most preferably about 0.34:0.66. Non-limiting examples of such glasses include $Ag_2S-As_2S_3$, $Ag_2S-Ag_2Te-As_2S_3$, $Ag_2S-As_2S_3-AgI$, and $Ag_2S-As_2S_3-AgBr$ glasses.

In embodiments, the chalcogenide glass comprises two silver chalcogenides. Non-limiting examples of such glasses include $Ag_2S-Ag_2Se$ and $Ag_2Se-Ag_2Te-As_2Se_3$ glasses. In preferred embodiments, the total mole ratio of the silver chalcogenides ($Ag_2Ch$, wherein Ch denotes a chalcogen) is from about 0.2 to about 0.5.

In embodiments, the chalcogenide glass further comprises a germanium chalcogenide GeCh, wherein "Ch" denotes a chalcogen. In preferred such embodiments, the $Ag_2Ch$:GeCh molar ratio is from about 0.2:0.8 to about 0.5:0.5. Non-limiting examples of such glasses include $Ag_2Se-$GeSe and $Ag_2S-$GeS glasses.

In embodiments, the chalcogenide glass further comprises a silver halide. In preferred embodiments, the $Ag_2Ch$:Ag halide molar ratio is from about 0.4 to about 0.7. In preferred such embodiments, the silver halide is silver iodide or silver bromide. Non-limiting examples of such glasses include $Ag_2S-As_2S_3-AgI$ and $Ag_2S-As_2S_3-AgBr$ glasses.

Therefore, overall, non-limiting examples of chalcogenide glasses include $Ag_2S-As_2S_3$, $Ag_2S-Ag_2Se$, $Ag_2Se-$GeSe, $Ag-As_2S_3-AgI$, $Ag_2S-As_2S_3-AgBr$, $Ag_2S-$GeS, and $Ag_2Se-Ag_2Te-As_2Se_3$ glasses. Preferred chalcogenide glasses include $Ag_2S-As_2S_3$ or $Ag_2S-Ag_2Se$ glasses. A most preferred chalcogenide glass is $Ag_2S-As_2S_3$ glass, preferably $(Ag_2S)_{0.3-0.4}(As_2S_3)_{0.6-0.7}$, most preferably $(Ag_2S)_{0.34}(As_2S_3)_{0.66}$.

In embodiments, the silver halide in the halide glasses is silver fluoride, silver chloride, silver bromide, or silver iodide. In preferred embodiments, the silver halide is silver iodide (AgI).

Herein, the term "glass-forming oxide of a metal or a metalloid" refers to an oxide of a metal or a metalloid used to form glasses.

In embodiments, the glass-forming oxide(s) of metal/metalloid is(are) AgO, $P_2O_5$, $VO_3$, $CrO_2$, $SiO_2$, $SnO_2$, $PbO_2$, $MoO_4$, and $WO_4$, preferably selected among Ag, P, Mo, and W oxides, and most preferably selected among Ag, Mo, and W oxides.

In embodiments, the halide glass comprises silver oxide and at least one other glass-forming oxide of metal/metalloid, preferably selected from the above lists. In preferred such embodiments, the silver oxide: other glass-forming oxide(s) of metal/metalloid in the halide glass is from about 0.2-0.8 to about 0.2-0.8, and preferably from about 0.5:0.5 to about 0.75:0.25, and most preferably either about 0.5:0.5 or about 0.75:0.25.

In embodiments, the silver halide: total glass-forming oxide(s) of metal/metalloid (including silver oxide) molar ratio in the halide glass is from about 0.4:0.6 to about 0.7:0.3, and most preferably about 0.6:0.4.

Preferred halide glasses include:
$AgI-Ag_2O-MoO_3$, preferably $AgI_x(Ag_2O)_y(MoO_3)_z$, and most preferably $AgI_{0.60}(Ag_2O)_{0.20}(MoO_3)_{0.20}$;
$AgI-Ag_2O-P_2O_5$, preferably $AgI_x(Ag_2O)_y(P_2O_5)_z$, and most preferably $AgI_{0.60}(Ag_2O)_{0.30}(P_2O_5)_{0.10}$; and
$AgI-Ag_2O-WO_3$, preferably $AgI_x(Ag_2O)_y(WO_3)_z$, and most preferably $AgI_{0.60}(Ag_2O)_{0.20}(WO_3)_{0.20}$, wherein x, y, and z are molar ratios, wherein x varies from about 0.4 to about 0.7, y varies from about 0.08 to about 0.56 and z varies from about 0.08 to about 0.56.

As will be well-known to the skilled person, the nomenclature of glasses (used herein as well as in the art) represents the molar ratio of the various elements in the glasses, not necessarily the form in which the elements are found in the glass. For example, P does not necessarily exist as $P_2O_5$ in $AgI_{0.60}(Ag_2O)_{0.30}(P_2O_5)_{0.10}$, rather based on current understanding, P should mostly exist as $PO_4^{3-}$.

As noted above, the pseudo-reference glass material can also be a composite comprising at least one of the above chalcogenide and/or halide glasses.

In embodiment, the composite comprises:
at least one the glasses described above and binder, or
at least one the glasses described above, a binder, and an electrically conductive carbon allotrope.

In embodiments, the binder is a polymeric binder, preferably an electrically conductive polymeric binder. Any binder known in the art to be useful in preparing electrodes can be used. The binder can be electrically conducting or non-electrically conductive. In preferred embodiments, the binder is electrically conducting so as to increase the conductivity of the composite. In alternative preferred embodiments, the binder is electrically non-conducting. A mixture of binders can also be used. Non-limiting examples of binders include:
Fluorine-containing polymers, such poly(vinylidene difluoride) (PVDF),
Poly(tetrafluoroethylene),
Carboxymethylcellulose.
Styrene butadiene rubbers,
Acrylic polymers, such as poly(acrylic acid),
Alginates, such as sodium alginate,
Polyurethanes,
Epoxies, Poly(vinyl chloride) (PVC),
Petroleum jelly,
Gums, such as Tragacanth gum,
Starches, such as Tapioca starch,
sodium carboxymethyl chitosan,
Chitosan sulfate ethylamide glycinamide,
Poly(methyl vinyl ether-alt-lithium maleic acid),
Supramolecular lithiated perylene bisimide,
Poly (3,4-ethylenedioxythiophene)
poly(3,4-ethylenedioxythiophene) (PEDOT),
poly(styrenesulfonate) (PSS),
polyethylenimine (PEI),
polypyrrole (PPY),
Poly(p-phenylene) (PPP),
polythiophene (PT), and
Polyanilline (PANI).

In preferred embodiments, the binder is epoxy or PVC.

As is well-known to the skilled person allotropes are different structural forms of an element within a same phase (i.e.: solid, liquid or gas), in which the atoms of the element are bonded together in a different manner. For example, oxygen allotropes include dioxygen ($O_2$—colorless gas, faint blue liquid and solid), ozone ($O_3$—blue), tetraoxygen ($O_4$—metastable), and octaoxygen, ($O_8$—red). Carbon allotropes (i.e. allotropes of the element carbon) constitute one of the most commonly known group of allotropes. The electrically conductive carbon allotrope is used in increase the electrical conductivity of the composite. Therefore, any electrically conductive carbon allotrope known in the art to be useful in preparing electrodes can be used. A mixture of carbon allotropes can also be used. Non-limiting examples of electrically conductive carbon allotropes include:

- Graphite—C atoms bonded in flat hexagonal lattices (graphene), which are then layered in sheets;
- AA'-graphite—similar to graphite, but where the sheets are positioned differently to each other as compared to the order in graphite;
- Graphene—a singe layer of graphite;
- Graphenylene—single layer carbon material with biphenylene-like subunits as basis in its hexagonal lattice structure, also known as biphenylene-carbon;
- Fullerenes—carbon atoms connected by single and double bonds so as to form a closed or partially closed mesh, with fused rings of five to seven atoms;
- Carbon nanotubes—allotropes of carbon with a cylindrical nanostructure, can be single-wall or multi-walls, can be seen as a subtype of fullerene (i.e. cylindrical fullerenes);
- Carbon nanobuds—a material that combines carbon nanotubes and spheroidal fullerenes, can be seen as a subtype of fullerene;
- Schwarzites—negatively curved carbon surfaces originally proposed by decorating triply periodic minimal surfaces with carbon atoms;
- Amorphous carbon—carbon that does not have any crystalline structure;
- Q-carbon—short for quenched carbon, a type of amorphous carbon that is ferromagnetic, electrically conductive and harder than diamond (among other properties);
- Carbon black—a form of paracrystalline carbon, subtypes include acetylene black, channel black, furnace black, lamp black and thermal black;
- Cyclocarbon—a chemical compound consisting solely of a number n of carbon atoms covalently linked in a ring;
- Glassy carbon—a class of non-graphitizing carbon widely used as an electrode material; and
- Carbide-derived carbon (CDC)—a family of carbon materials with different surface geometries and carbon ordering that are produced via selective removal of metals from metal carbide precursors, such as TiC, SiC, $Ti_3AlC_2$, $Mo_2C$, etc.

In preferred embodiments, the carbon allotrope is graphite or glassy carbon.

In more preferred embodiments, the carbon allotrope is graphite.

In preferred embodiments, the composite comprises Polyfast™, which comprises both a binder and a carbon allotrope. Indeed, Polyfast™ is commercially available mixture of a thermoset polymer and a carbon allotrope (graphite) for making SEM electrodes.

The pseudo-reference glass material can be in different forms, for examples pellets or films. Films of such materials are typically divided into thin and thick films. Thin films have a thickness of about 100 μm or less, while thick films have a thickness of more than 100 μm. Thin films can be produced by chemical vapor deposition (CVD) or, less commonly, by electrochemical deposition. Thick films can be produced by spreading the pseudo-reference glass material on a substrate, advantageously on the silver conductor In the forms where the pseudo-reference glass material presents a flat glass surface are ideal for fabricating vertical microflow cells, which avoids bubble trapping.

In embodiments of the pseudo-reference electrode of the invention, the silver conductor is supported on an electrically insulating substrate. Any ceramic or polymeric material that is electrically non-conducting and non-reacting in harsh aqueous environment can be used. Non-limiting examples of substrates include polypropylene, acrylonitrile butadiene styrene (ABS), polyphenylene sulfide (PPS, e.g. from Ryton®), epoxy, polyvinyl chloride (PVC), alumina, corundum, as well as borosilicate, silica, and other silica-based glass.

Synthesis of the Chalcogenide and Halide Glasses

AgI and other raw materials, such as metal or metalloid carbonates, oxides, nitrates, sulfates, or other are selected according the composition of the desired glass.

The selected raw materials are weighted, mixed together, and grounded in an agate mortar. A pre-mixing step such as a ball milling (or other types of milling) can be used if large quantities of glasses are needed.

The mixed raw materials are then collected in a crucible (such as aluminum oxide, quartz, or platinum crucibles) and placed into an electric furnace preheated to a selected temperature, typically for 30 minutes to 2 hours. For non-oxide glasses, glass synthesis needs to be done in a vacuum-sealed quartz crucible.

Optionally, a pre-treatment at a lower temperature can be used if the raw chemicals contain large amounts of volatile constituents, i.e. $NH_4H_2PO_4$. Lower temperature may help to form intermediate compounds before the formation of desired glass as the final product. The resulting intermediate compound(s) are mixed and ground for uniformity.

The resulting low viscosity liquid is splat-cooled between stainless steel plates and the quenched glass annealed at a temperature close but below its Tg for 2 h to relieve thermal stress.

Reference Half-Cell and ISE Sensor of the Invention

In another aspect of the invention, there is provided a reference half-cell of an ISE sensor comprising pseudo-reference electrode of the invention.

In yet another aspect of the invention, there is provided an ISE sensor comprising the reference half-cell of the invention, a sensing half-cell and a voltmeter; the reference half-cell and the sensing half-cell being connected to a voltmeter. The sensing half-cell, voltmeter and various connections are as described above for FIG. 1 and not further discussed in this section.

Figure 2:
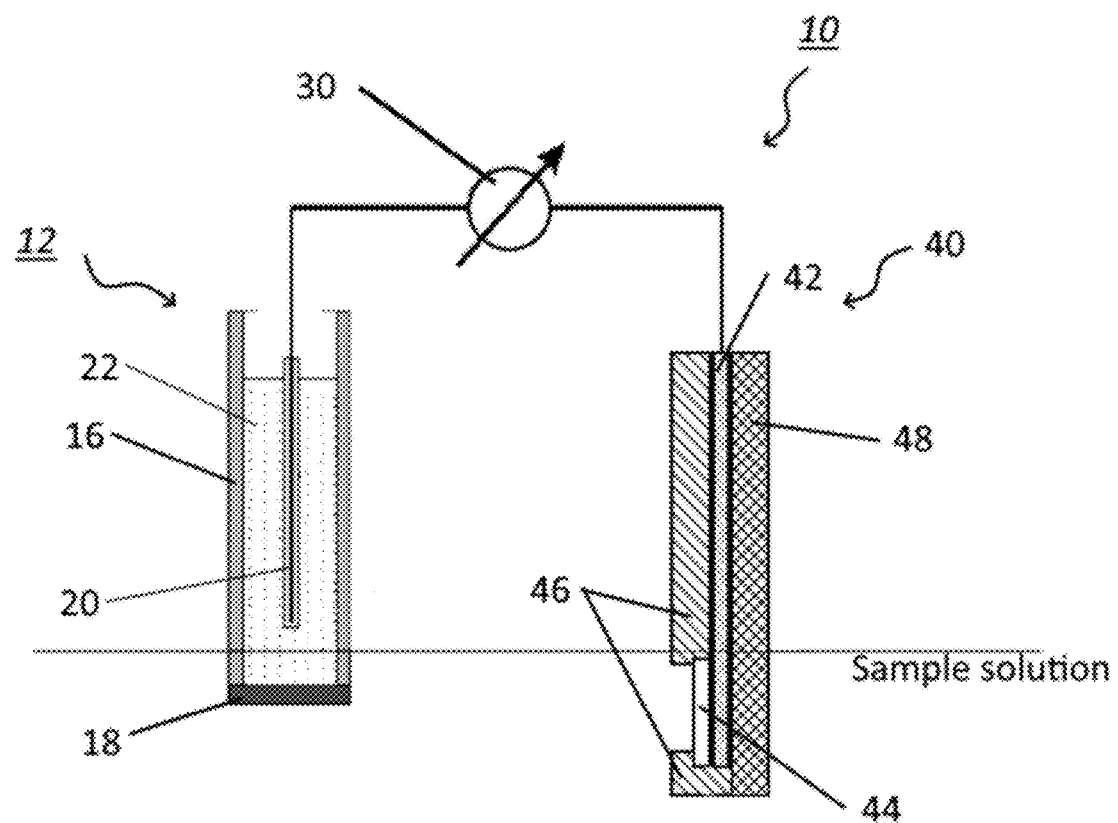
FIG. 2 is a scheme of an ISE sensor (10) comprising a pseudo-reference electrode according to an embodiment of the invention.

FIG. 2 shows is a scheme of an ISE sensor (10) with a reference half-cell (40) according to an embodiment of the invention. This reference half-cell (40) comprises the pseudo-reference electrode of the invention. As noted above, the pseudo-reference electrode of the invention comprises a pseudo-reference glass material (44) backed by a silver conductor (42).

In use in a reference half-cell of an ISE sensor, the pseudo-reference glass material (44) is in contact with the sample solution, while the silver conductor is shielded from it. Thus, in embodiments of the reference half-cell of the invention, parts of the pseudo-reference glass material (44) and/or the silver conductor (42) are shielded by a layer of electrically insulating material (46). Non-limiting examples of electrically insulating materials include borosilicate glasses, epoxy, polyvinyl chloride (PVC), silicone, polytetrafluoroethylene (Teflon®), and neoprene.

Further, as noted above, in embodiments, the silver conductor (42) is supported on a substrate (48).

Ion-Selective Field Effect Transistors (ISFET)

The pseudo-reference electrode of the invention can also be used in ion-selective field effect transistors (ISFETs). Thus, in another aspect of the invention, there is provided an ISFET comprising pseudo-reference electrode of the invention.

There is also provided the use of the pseudo-reference electrode of the invention as a reference electrode in an ion-selective field effect transistor.

Ion-Selective Field Effect Transistors (ISFETs) can be considered as traditional Metal Oxide Semiconductor Field Effect Transistors (MOSFETs) in which the gate terminal has been replaced by an ion-sensitive membrane.

Figure 3:
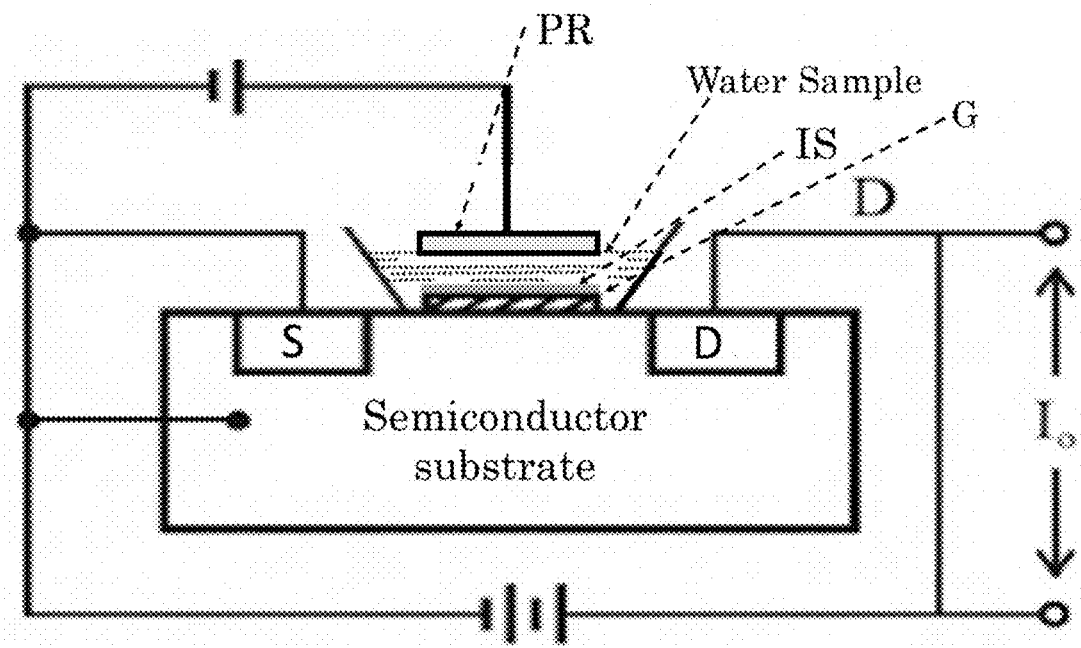
FIG. 3 is a scheme of an ion-selective field effect transistors comprising of a pseudo-reference electrode according to an embodiment of the invention.

FIG. 3 is a scheme of an ion-selective field effect transistors comprising a pseudo-reference electrode according to an embodiment of the invention. Image is modified from http://cc.ee.ntu.edu.tw/-ultrasound/belab/midterm_oral_files/2018_106_2/106_1_G8.pdf In the Ion Selective Field-Effect Transistor (ISFET) of FIG. 3, the ion sensing (IS) and pseudo-reference (PR) half-cell electrodes generate a voltage, which is dictated by the concentration of selected ions in the water sample (in between the two half-cells. This voltage alters the electric field at gate, G. The electric field at G controls the flow of charge (current $I_o$) from the source (S), through a semiconductor substrate, to the drain (D). The concentration of the selected ion in the water sample can therefore be measured as it is proportional to $I_o$.

The ion sensing comprises an ion-selective membrane. Typically, the semiconductor substrate is a p-type silicon substrate with source S and drain D diffusions separated by a channel which is overlain by $SiO_2$ as insulator and the gate G.

DEFINITIONS

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted. In contrast, the phrase "consisting of" excludes any unspecified element, step, ingredient, or the like. The phrase "consisting essentially of" limits the scope to the specified materials or steps and those that do not materially affect the basic and novel characteristic(s) of the invention.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Example 1—Pseudo-Reference Electrodes

The following glasses were provided:
A. $(Ag_2S)_{0.34}(As_2S_3)_{0.66}$ (hereinbelow "Ag—S—As");
B. COMPARATIVE—$AgI_{0.60}(Ag_2O)_{0.235}(B_2O_3)_{0.165}$ (hereinbelow "AgI—AgO—BO");
C. $AgI_{0.60}(Ag_2O)_{0.20}(MoO_3)_{0.20}$ (hereinbelow "AgI—AgO—MoO");
D. $AgI_{0.60}(Ag_2O)_{0.30}(P_2O_5)_{0.10}$ (hereinbelow "AgI—AgO—PO"); and
E. $AgI_{0.60}(Ag_2O)_{0.20}(WO_3)_{0.20}$ (hereinbelow "AgI—AgO—WO").

Figure 4:
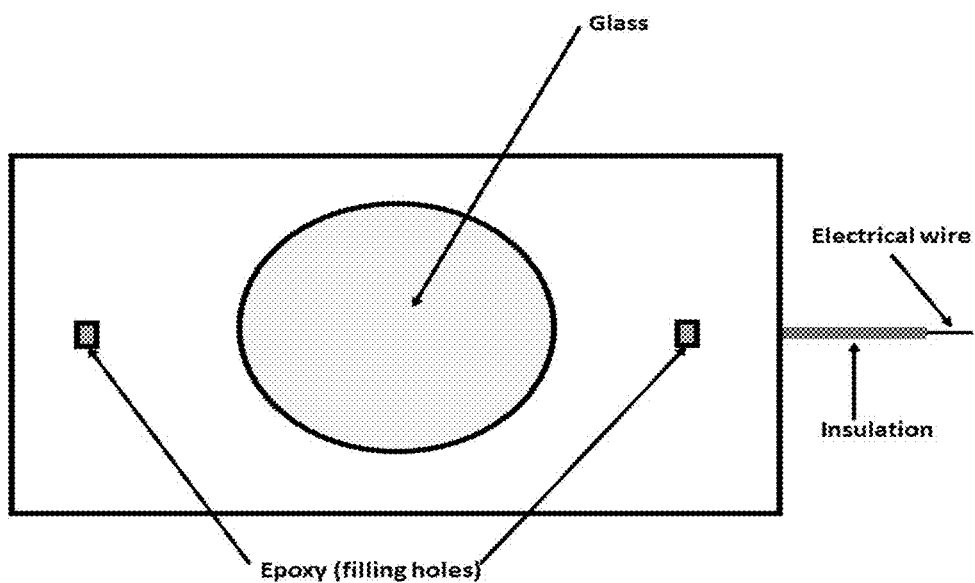
FIG. 4 is a photograph of an assembled glass pseudo-reference electrode according to an embodiment of the invention.
Figure 5:
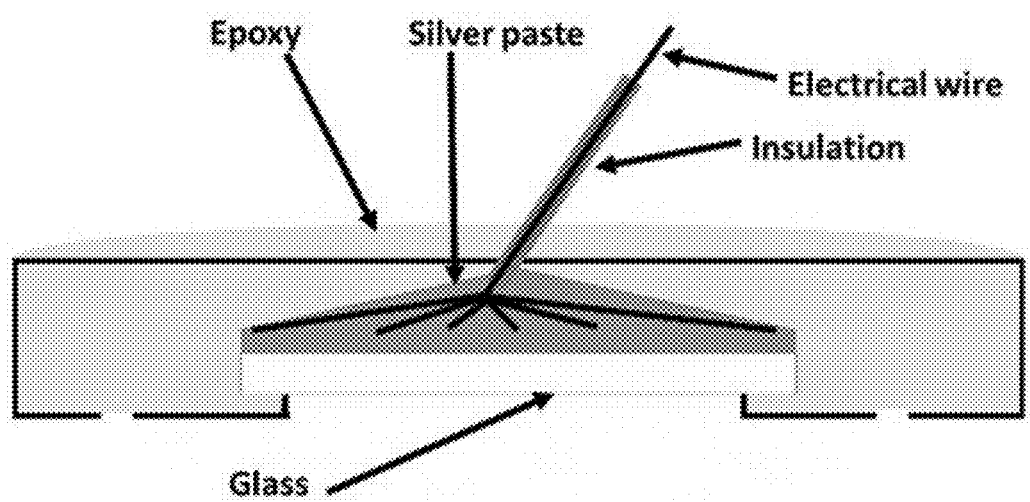
FIG. 5 is a cross section of an assembled glass pseudo-reference electrode according to an embodiment of the invention.

Pseudo-electrodes were prepared as follow: The glass materials were roughly cut into disks and polished to about 13 mm in diameter and less than 1 mm thick. The disk was attached via its edges to a hole on 3-D printed ABS mould with quick dry epoxy (FIG. 4). The edges of the glass were adhered to the edges of an open hole of the mould. Most of the glass surface was exposed and remained uncontaminated with epoxy. Silver paste was applied to the back of the glass electrode to provide silver backing. The assembly was heated in an oven overnight at 85° C. to dry the silver paste. An electrical wire was attached over the silver backing with additional silver paste. The assembly was heated in an oven overnight at 85C to dry the silver paste. Low-viscosity epoxy was poured over the wire and the silver paste until the mold was filled with epoxy to ensure that water could only come in contact with the glass surface (FIG. 5). The assembly was heated in a vacuum oven overnight at 85° C. and −20 mmHg (g) to remove bubbles and cure the epoxy.

Example 2—Evaluation of Pseudo-Reference Electrodes of the Invention Using the Ferri/Ferro-Cyanide Redox Couple Equipment and Materials
Potentiostat. Princeton Applied Research (PAR) model 263A
Nitrogen gas for electrolyte purging A beaker or an electrochemical cell with ports for working electrode, reference electrode, counter electrode, pseudo-reference electrode, nitrogen inlet, nitrogen outlet.

Platinum wire for working electrode (WE)

Platinum mesh for counter electrode (CE)

Basi Ag|AgCl for reference electrode (RE)—confirmed to be in good health

Pseudo-reference electrode of the invention prepared as described in Example 1 using glasses A to E. Sometimes used as RE or WE depending on the test 10 mM potassium ferricyanide in 1 M potassium nitrate solution 1 M potassium nitrate A butane torch for platinum electrode cleaning Test Procedures and Results Below, we used a cyclic voltammogram (CV) of the ferri-/ferro-cyanide redox couple on a platinum WE to demonstrate that the pseudo-reference electrodes of the invention worked like a standard reference electrode, so the CV of our pseudo-reference electrodes was compared to that the CV of a standard reference electrode.

The following pseudo-reference electrodes of the invention were tested.

Note that in test 2.1 the pseudo-reference electrode was not used. In test 2.3, Ag|AgCl RE was removed and replaced with the pseudo references of the invention. Test 2.1 is done to check that the experimental setup is correct regardless of which pseudo-reference is being studied. The readings did move only a few millivolts from day-to-day.

Test 2.1: Establishing a Correct Ferri-/Ferro-Cyanide Cyclic Voltammogram (CV)

The goal of this experiment was to establish that our CV system was in working order. The steps for this experiment were:

We thoroughly cleaned the platinum wire and the platinum mesh with a butane flame (hold the electrodes in the flame until they are red hot).

We set up the electrochemical cell with the 10 mM potassium ferricyanide in 1 M potassium nitrate solution as the electrolyte, and inserted the platinum wire, platinum mesh and the BASi Ag|AgCl RE into their respective ports. Place the cell onto a magnetic stir plate and insert a magnetic stir bar.

While stirring, we bubbled the electrolyte with nitrogen for at least 10 minutes, then lifted the nitrogen line so that the gas was flowing across the surface of the electrolyte.

We connected the potentiostat in the following configuration:

Sensing Electrode lead: plugged to Working Electrode lead,

Working Electrode lead: clipped to platinum wire,

Counter Electrode lead: dipped to platinum mesh, and

Reference Electrode lead: dipped to BASi Ag|AgCl reference electrode.

We performed a cyclic voltammetry (CV) scan from 0 V vs RE to 0.75V vs RE. We used a scan rate of 100 mV/sec and we performed 4 or 5 cycles.

We checked that the initial potential was 0 V vs Open Circuit Potential (OCP).

Figure 6:
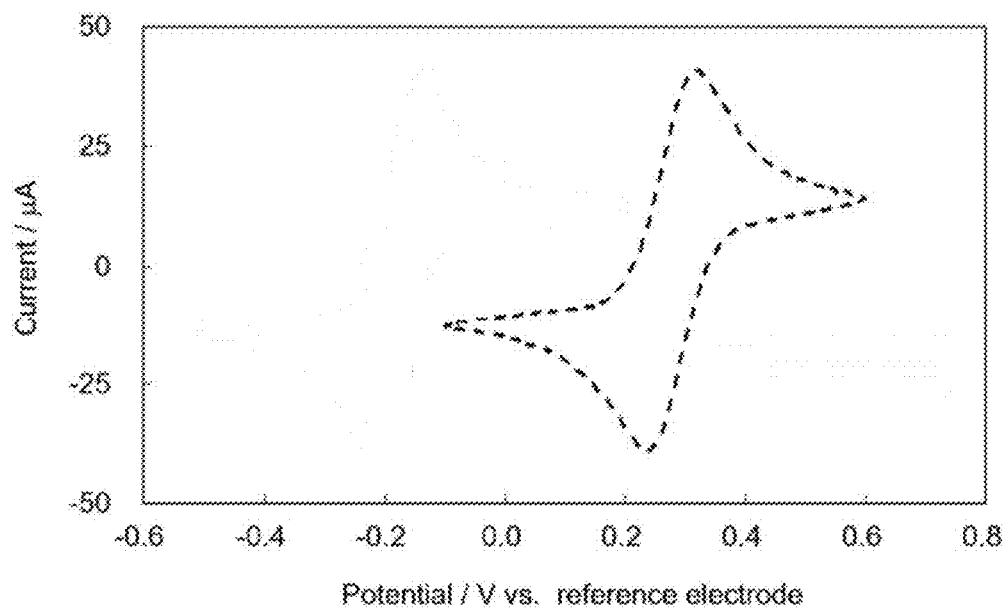
FIG. 6 is an example of the cyclic voltammogram (CV) of the ferri-/ferro-cyanide redox couple vs an Ag|AgCl reference electrode—modified from Electrochemistry Communications 103 (2019) 133-137.

We checked that the measured CV was similar to that shown in FIG. 6.

We calculated the difference between the positive and negative peaks of the measured CV.

We checked that this difference was less than about 70 mV. Indeed, while the ideal difference should be 59 mV, practically if the difference was less than about 70 mV, it was considered normal. If the potential difference between the two peaks was much larger than about 70 mV, this could mean that the platinum RE was dirty and the experiment was repeated anew after cleaning the platinum RE.

Test 2.2: Determining the Open Circuit Potential of the Pseudo-Reference Electrode of the Invention The goal of this experiment was to determine what potential the pseudo-reference electrodes of the invention was in our CV system. The bounds of the CV performed previously were referenced to the potential of the Ag|AgCl RE. It was expected that the CV measured here may change since our pseudo-reference electrode was likely not to have a potential identical to that of the Ag|AgCl. The steps for this experiment were:

Using the same step as in the previous experiment, we connected the potentiostat in the following configuration:

Sensing Electrode lead: plugged to the Working Electrode lead,

Working Electrode lead: clipped to the pseudo-reference electrode of the invention, Counter Electrode lead: dipped to the platinum mesh, and Reference Electrode lead: dipped to the BASi Ag|AgCl reference electrode.

After soaking the electrodes for 10 minutes, we performed an Open Circuit Potential (OCP) measurement for 10 minutes.

We checked that this potential was very stable. If it was not, it could mean that the pseudo-reference electrode of the invention is unlikely perform well as a reference electrode.

Test 2.3: Evaluating the Behaviour or the Pseudo-Reference Electrodes of the Invention This test was used to demonstrate that the pseudo-reference electrodes of the invention could behave like a reference electrode. The steps for this experiment were:

Using the same step as in the previous experiment, we turned on the stirrer, and bubbled the electrolyte with nitrogen for at least 10 minutes, then we lifted the nitrogen line so that the gas was flowing across the surface of the electrolyte.

We connect the potentiostat in the following configuration:

Sensing Electrode lead: plugged to the Working Electrode lead,

Working Electrode lead: clipped to the platinum wire,

Counter Electrode lead: dipped to the platinum mesh, and

Reference Electrode lead: dipped to the pseudo-reference electrode of the invention.

We performed a cyclic voltammetry (CV) scan from (0-X) V vs RE to (0.75-X) V vs RE. We used a scan rate of 100 mV/sec and we perform 4 or 5 cycles.

We checked that the initial potential was 0 V vs OCP.

Figure 7:
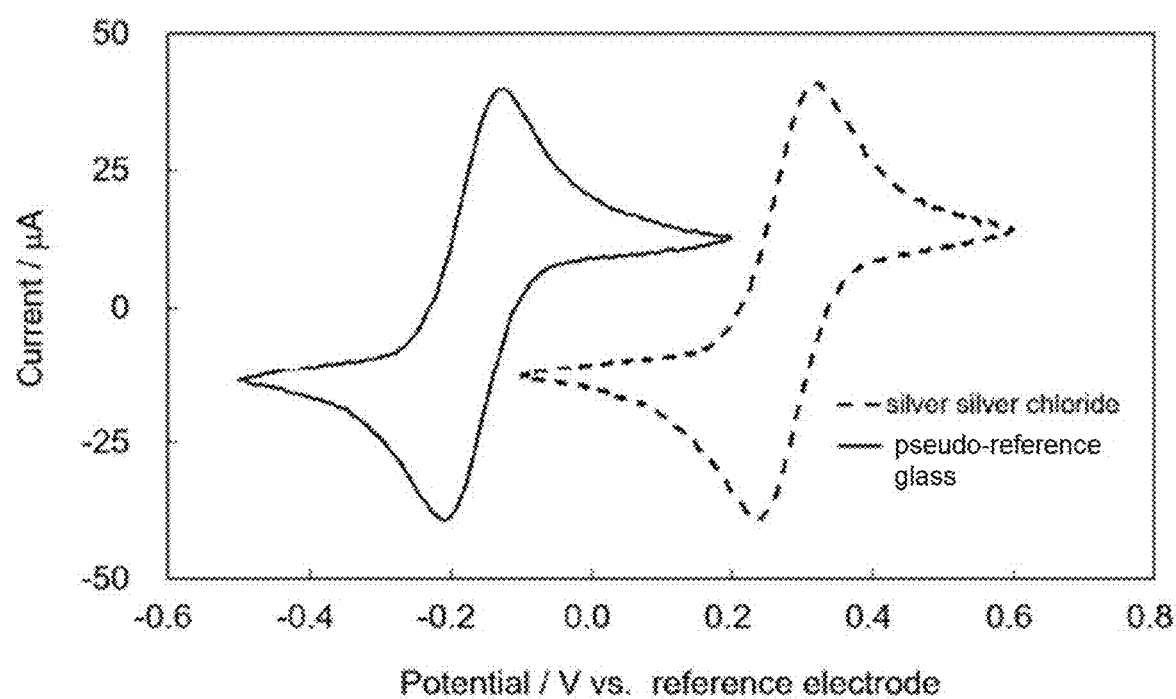
FIG. 7 is an example the CV of the fem-/ferro-cyanide redox couple vs Ag|AgCl and that vs another reference electrode—modified from Electrochemistry Communications 103 (2019) 133-137.

We checked that the measured CV was identical in shape to that measured in Test 2.1 but merely shifted along the X axis (i.e. a shift similar to that shown in FIG. 7)Erreur! Source du renvoi introuvable.

We checked that the potential shift between any two corresponding points on the two CVs was equal to X.

Results of Test 2.1 to 2.3

The table below summarizes the results of tests 2.1 to 2.3

TABLE 1

Summary of results for tests 2.1, 2.2, 2.3.

| | (Test 2.1)* Ref Ag/AgCl Comparative | | Ag—S—As | | AgI—AgG—BO Comp. | | AgI—AgO—MoO | | AgI—AgO—PO | | AgI—AgO—WO | |
|---|---|---|---|---|---|---|---|---|---|---|---|---|
| | + | − | + | − | + | − | + | − | + | − | + | − |
| current direction Test 2.2 | + | − | + | − | + | − | + | − | + | − | + | − |
| OCP drift (mV/10 min) Test 2.3 | 0 | | 0 | | 2 | | 2 | | 0 | | 2 | |
| Peak (mV) | 307 | 240 | 369 | 293 | 98 | 34 | 200 | 130 | 113 | 43 | 169 | 100 |
| Difference between + and − peaks | 67 | | 76 | | 64 | | 70 | | 70 | | 69 | |
| Shift versus ref. Ag/AgCl | 0 | | +57.5 | | −207.5 | | −108.5 | | −195.5 | | −139 | |

*This column is result for Test 2.1. It is always done at the start of the day to check the experimental setup regardless of which experiment or pseudo-reference is being studied.

Test 2.4: Evaluating the Pseudo-Reference Electrode Behaviour in Different Supporting Electrolytes Ideal reference electrodes perform the same indifferent electrolytes. To determine how well the pseudo-reference electrodes of the invention performed in that regard, we repeated Test 2.1 to 2.3 in the different electrolytes: Cl⁻, Br⁻, I⁻, $CO_3^{2-}$, $SO_4^-$.

Figure 8:
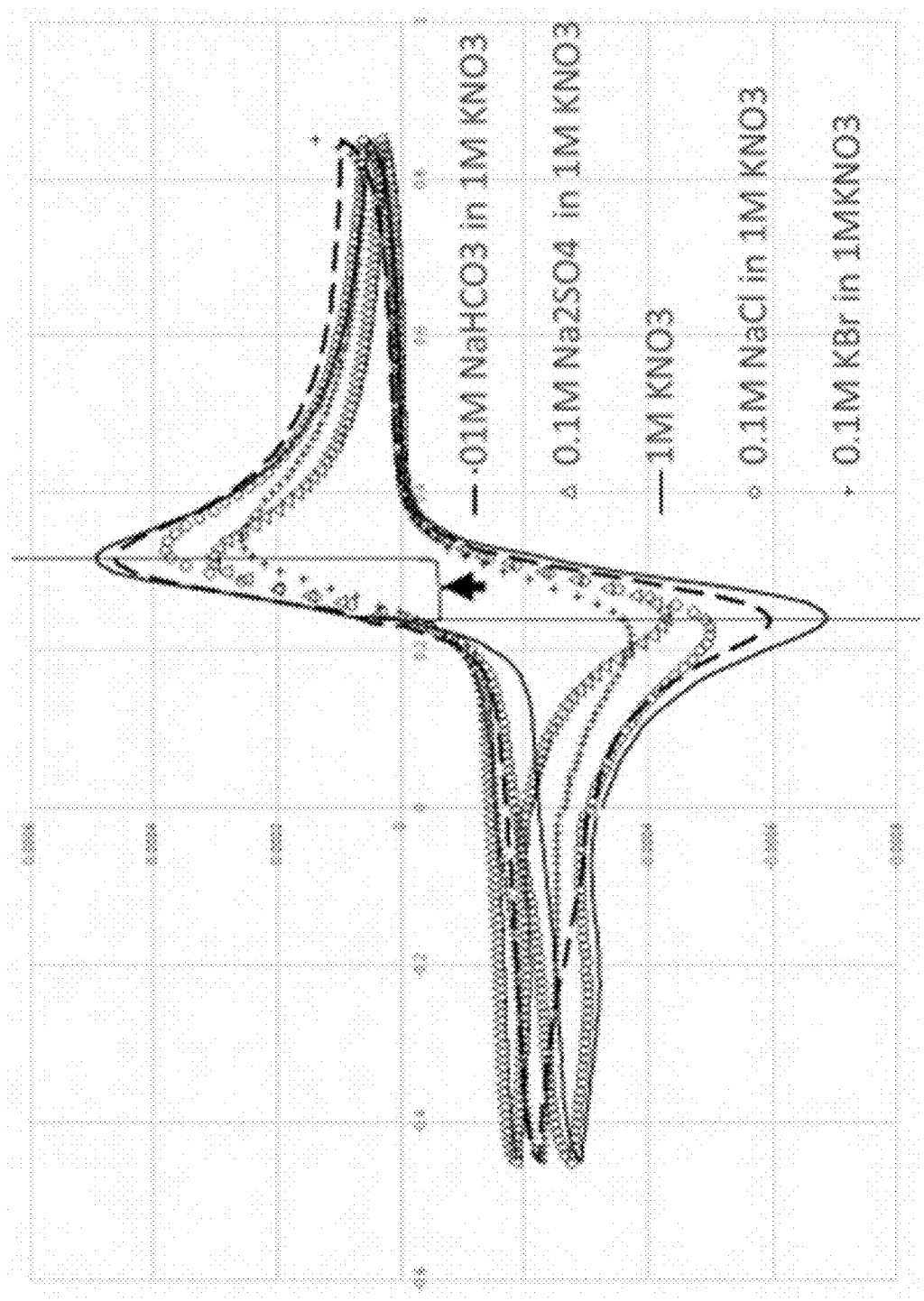
FIG. 8 shows the CV measured for a conventional reference electrode (BASi Ag—AgCl reference electrode) in the presence of various electrolytes

FIG. 8 shows the CV measured for a conventional reference electrode (BASi Ag—AgCl reference electrode) in the presence of various electrolytes. The arrow indicates the redox potential (X) in the CV of $Fe(CN)_6$. Notice that the upward and downward peaks of this CV are close together. Also, the peaks positions do not significantly change in different electrolytes.

Figure 9:
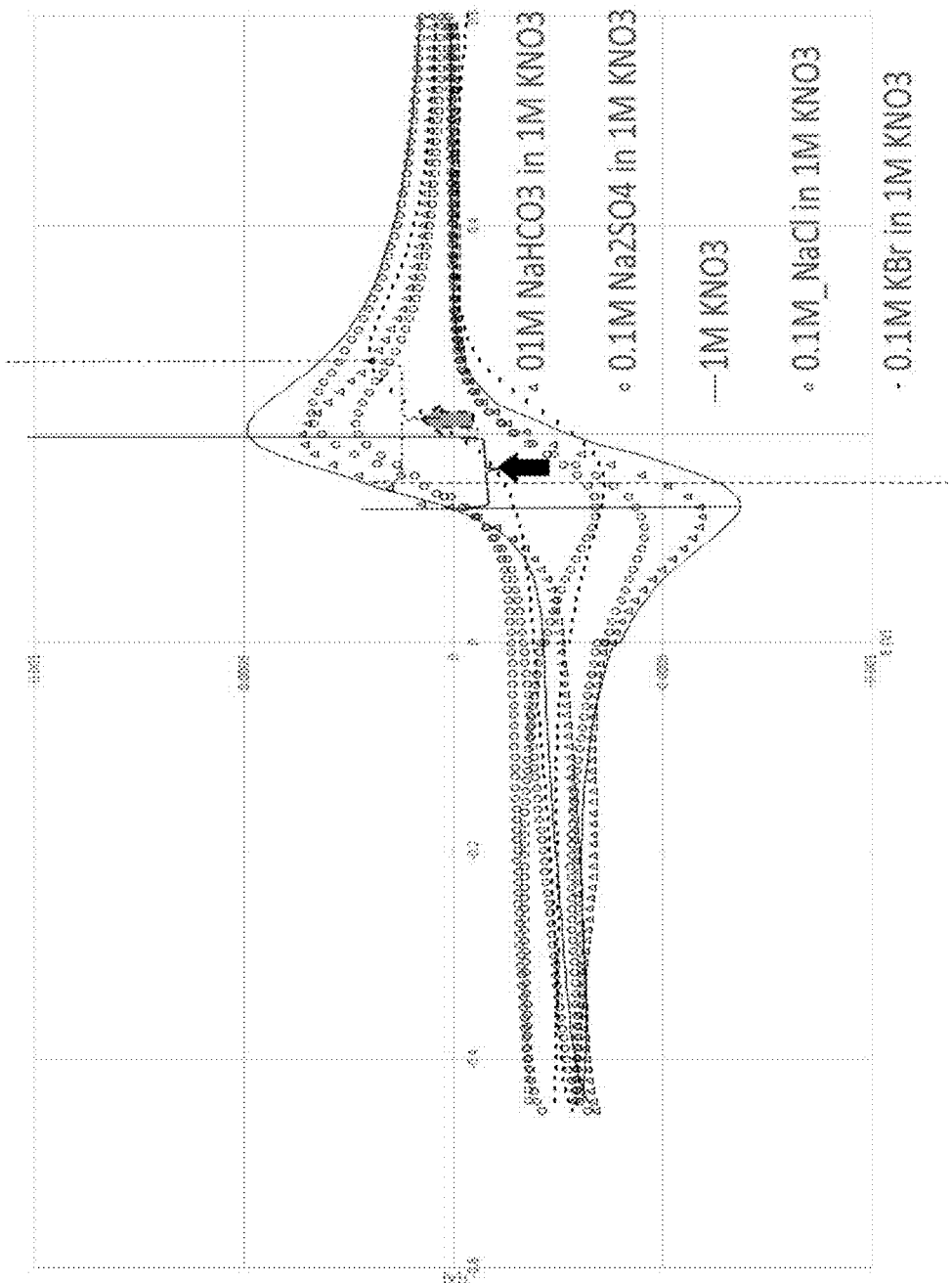
FIG. 9 shows the CV measured for the AgI—AgO—MoO pseudoelectrode of the invention in the presence of various electrolytes.

FIG. 9 shows the CV measured for the AgI—AgO—MoO pseudoelectrode of the invention, an example of the invention, in different supporting electrolytes. The black arrow indicates the redox potential (X) in the CV of $Fe(CN)_6$. It was found that the electrodes of the invention performed non-ideally, i.e. they performed as pseudo-reference electrodes. Indeed, the pseudo-reference electrode of the invention had different potential differences in some of the different electrolytes (i.e. in this case, the measured value X changed in the presence of Br, shown as dotted lines and grey arrow in FIG. 9). However, this does not mean that they cannot be used as reference electrodes in various applications. Rather, it means only that, before they are used, their potential behaviour in a particular electrolyte needs to be characterized so that it can be taken into account when interpreting the results.

The results of the various electrodes are reported in Table 2. Note that Test 2.4 was not done for Ag—S—As glass as its behaviour different electrolytes has already been previously characterized in Test 3 (reported in Example 3 below).

TABLE 2

Measured redox potential of $Fe(CN)_6$ (X. mV) of different electrode in different supporting electrolytes

| | Ref Ag/AgCl Comparative | AgI—AgO—BO Comparative | AgI—AgO—MoO | AgI—AgO—PO | AgI—AgO—WO |
|---|---|---|---|---|---|
| 0.1M $NaHCO_3$ in 1M $KNO_3$ | 0 | −15.5 | 0 | −25.5 | 0 |
| 0.1M $NaS_2O_4$ in 1M $KNO_3$ | 0 | −44.5 | 0 | 20.5 | 0 |
| 0.1M NaCl in 1M $KNO_3$ | 0 | 40 | 0 | −45 | 0 |
| 0.1M KBr in 1M $KNO_3$ | 0 | −150 | 40 | 25 | 50 |

Test 2.5: Evaluating the Long-Term Stability of the Pseudo-Reference Electrode

Ideal reference electrodes perform the same day after day. To determine how well the pseudo-reference electrodes of the invention performed in that regard, we repeated Test 2.3 after wiping cleaning of the pseudo-reference electrode surfaces with DI water. The repeat test was done after one month.

TABLE 3

Long term stability test by comparing OCP of AgI—AgO—MO [where M = B, Mo, P and W] versus Ag|AgCl reference electrode before and after allowing NaCl solution to dry up on it.

| | Electrode | | | | |
|---|---|---|---|---|---|
| | Ag—S—As | AgI—AgO—BO Comparative | AgI—AgO—MoO | AgI—AgO—PO | AgI—AgO—WO |
| Before | −55 | 66 | 105 | 70 | 134.5 |
| After | −81 | 80 | 111 | 88.5 | 139 |

Note that even if OC drift in the long term, in real world application this is correctable through periodic calibration of ISE versus known standards.

Example 3—Open Circuit Voltage Versus Ag|AgCl in the Presence of Various Concentrations of Various Potentially Interfering Species Materials 0.1 M solutions of $Fe^{3+}$, $Al^{2+}$, $SO_4^{2-}$, $F^-$, $Br^-$, and $Cl^-$ were prepared as stock solution.

$10^{-2}$, $10^{-3}$, $10^{-4}$, $10^{-5}$, $10^{-6}$ and $10^{-7}$ M variants of the abovementioned 0.1 M solutions were prepared by serial dilution using 0.1 M $KNO_3$ as diluent in order to the maintain ionic strength of the solutions.

Pseudo-Reference Electrode Performance Evaluation

The pseudo-reference electrode prepared as described in Example 1 were stored in 0.01M Cl for two hours for conditioning. The BASi Ag|AgCl reference electrode was stored in 3M NaCl as per manufacturer recommendation. After that, the open circuit potential (OCP) of each pseudo-reference electrodes were sequentially evaluated versus an Ag/AgCl reference electrode (BASi Inc) in a beaker containing the test solution using a PAR 263A 3 potentiostat. The solutions were constantly stirred with a magnetic stirrer for three minutes before measurement. When transferring between solutions, all electrodes were rinsed with deionized water and gently patted dry with Kimwipes® to prevent cross contamination.

The Ag—S—As pseudo-reference electrodes response to various concentrations of $Cl^-$, $F^-$, $Br^-$, $SO_4^{2-}$, $Fe^{3+}$ and $Al^{2+}$ solutions was measured. The AgI—AgO-MO [where M=B, Mo, P and W] were only tested for Al and Fe as their behaviour in anions have already been studied in Test 2.4. Their response to 0.1 M $KNO_3$ was also measured as a blank. The solutions tested ranged from 0.01 M and were diluted ten times until their response was similar to that of pure 0.1 M $KNO_3$. As a quality control procedure, the 0.01 M test solution was retested after the lowest concentration to confirm drift and reproducibility behavior. All experiments were performed at room temperature 21+/−20.53° C.

Results

Figure 10:
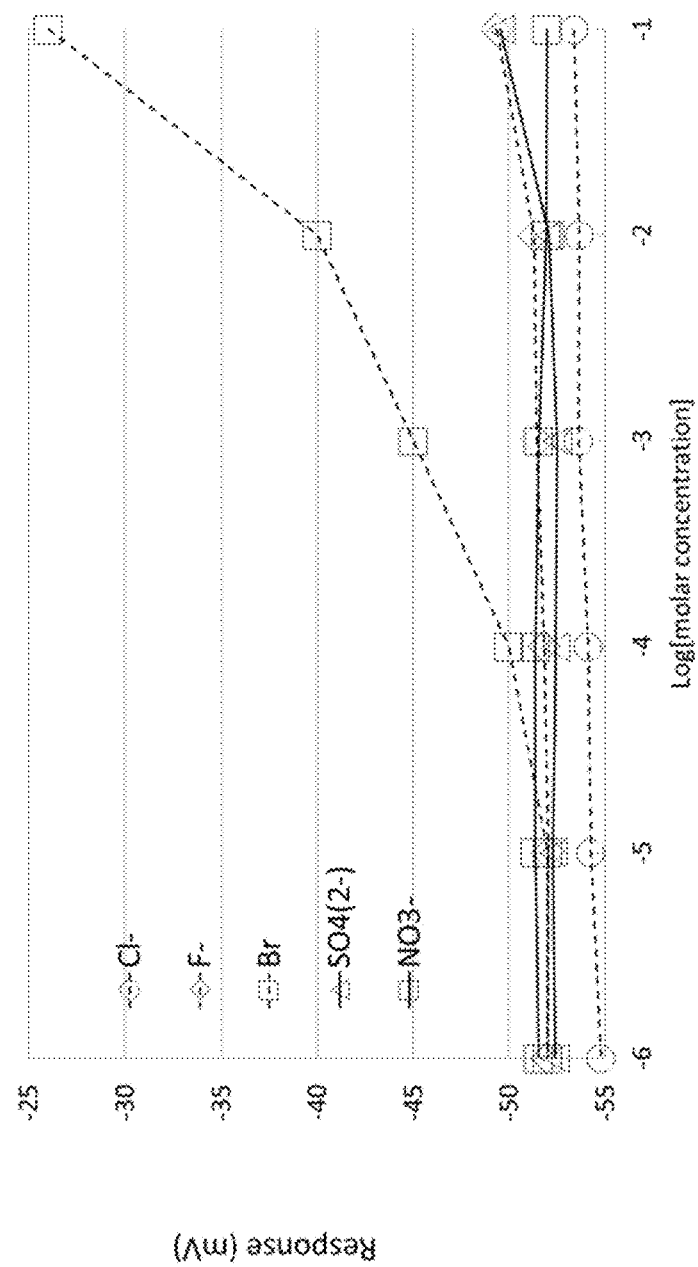
FIG. 10 shows the potential measured for the Ag—S—As glass pseudo-electrode of the invention at different concentrations of various electrolytes.

FIG. 10 shows the potential measured for the Ag—S—As glass pseudo-electrode of the invention at different concentrations of various electrolytes. This electrode showed little sensitivity to the potentially interfering anions except bromide.

Table 4 below shows the influence of $Fe^{3+}$ and $Al^{2+}$ various ion concentrations on the potential measured for the electrodes listed.

TABLE 4

| | Electrode | | | | |
|---|---|---|---|---|---|
| | Ag—S—As | AgI—AgO—BO Comparative | AgI—AgO—MoO | AgI—AgO—PO | AgIAgWO |
| | | | Open Circuit Voltage (mV) | | |
| $Fe^{2+}$ Concentration (M) | | | | | |
| $1 \times 10^{-2}$ | −51 | 223 | 210 | 196 | 156 |
| $1 \times 10^{-3}$ | −51 | 235 | 210 | 197 | 154 |
| $1 \times 10^{-4}$ | −53 | 240 | 208 | 203 | 153 |
| 0 | −55 | 257 | 208 | 205 | 153 |
| $Al^{2+}$ Concentration (M) | | | | | |
| $2 \times 10^{-2}$ | −53 | 232 | 211 | 198 | 154 |
| $2 \times 10^{-3}$ | −53 | 249 | 211 | 201 | 155 |
| $2 \times 10^{-4}$ | −53 | 259 | 215 | 203 | 157 |
| 0 | −55 | 257 | 208 | 205 | 153 |
| Remarks | | A | B | C | B |

A = COMPARATIVE—poor performances, OCP undesirably increases with decreasing ion concentration: +0.034 for $Fe^{2+}$ and +0.025 for $Al^{2+}$
B = excellent performances, no noticeable OCP increase at tested ion concentrations
C = good performances, slight OCP increase with decreasing ion concentration: 0.009 for $Fe^{2+}$ and 0.007 for $Al^{2+}$ The scope of the claims should not be limited by the preferred embodiments set forth in the examples, but should be given the broadest interpretation consistent with the description as a whole.

REFERENCES

The present description refers to a number of documents, the content of which is herein incorporated by reference in their entirety. These documents include, but are not limited to, the following:

M. Vlaclavikova, K. Vitale, G. P. Gallios and L. Ivanikova, "Water treatment technologies for the removal of high-toxicity pollutants", Springer-Verlag, Berlin (2008)

S. Dashti, K. Healey, Y. Iman, N. Wright. E. Plate and M. Zimmer, Mid-Columbia Physical Habitat Monitoring Project: Implementation Year 9, Reference: CLBMON-15a, BCHydro report (2015).

Continuous Water-Quality Sampling Programs: Operating Procedures, Watershed and Aquifer Science, Science and Information Branch, B.C. Ministry of Environment for the Resources Information Standards Committee, Government Publication Services, Victoria, BC.

United States Geological Services, Continuous Water Quality Monitoring Network Website. https://www.usgs.ov/centers/ne-water/sience/contnuous-water-quality-monitoring-network?qt-science=&qt-science_center_objects=0#qt-science_center_objects Thiago V. Moreno, Luis C. Malacame, Mauro L Baesso, Wei Qu, Eben Dy, Zhong Xie, Jason Fahlman, Jun Shen, Nelson G. C. Astrath, Potentiometric sensors with chalcogenide glasses as sensitive membranes: A short review, Journal of Non-Crystalline Solids, Volume 495, 2018, 8-18, https://doi.org/10.1016/j.inoncrysol.2018.04.057

M. C. R. Shastry and K. J. Rao, A Chemical Approach to an understanding of the Fast Ion Conduction in Silver Iodide-Silver Oxysalt Glasses, Solid State Ionics, 37, 1989, 17-29.

U.S. Pat. No. 4,282,079*
U.S. Pat. No. 3,853,731
U.S. Pat. No. 5,464,511*
U.S. Pat. No. 4,437,969
US patent application publication no. 2004/0163949***
US patent application publication no. 2001/0032785***
Bakker and Qin, Electrochemical Sensors, Anal Chem. 2006 Jun. 15; 78(12): 3965-3984. doi:10.1021/ac060637m.
Pine Research Instrumentation, Overview of Reference Electrodes and Alternative Reference Electrodes, Brief Discussion about Standard and Pseudo Reference Electrodes, Document #: DRK10053 (REV001|April 2016), pages 1-12.
Ghosh et al., All-Solid-State Sodium-Selective Electrode with a Solid Contact of Chitosan/Prussian Blue Nanocomposite, Sensors 2017, 17(11), 2536; https://doi.org110.3390/s17112536.
Komoda et al., Instantaneously usable screen-printed silver/silver sulfate reference electrode with long-term stability, Electrochemistry Communications 103 (2019) 133-137.

The invention claimed is:

1. A pseudo-reference electrode comprising a pseudo-reference glass material backed by a silver conductor comprising silver metal,
wherein the pseudo-reference glass material is:
a chalcogenide glass comprising a silver chalcogenide $Ag_2Ch$, wherein Ch denotes a chalcogen, or
a halide glass comprising a silver halide and at least one glass-forming oxide of a metal or a metalloid,
a mixture of two or more of these glasses, or
a composite of at least one of these glasses.

2. The pseudo-reference electrode of claim 1, wherein the chalcogenide glass further comprises an arsenic chalcogenide $As_2Ch_3$, wherein Ch denotes a chalcogen.

3. The pseudo-reference electrode of claim 2, wherein the chalcogenide glass is a $Ag_2S$—$As_2S_3$, $Ag_2S$—$Ag_2Te$—$As_2S_3$, $Ag_2S$—$As_2S_3$—$AgI$, or $Ag_2S$—$As_2S_3$—$AgBr$ glass.

4. The pseudo-reference electrode of claim 1, wherein the chalcogenide glass comprises two silver chalcogenides.

5. The pseudo-reference electrode of claim 4, wherein the chalcogenide glass is a $Ag_2S$—$Ag_2Se$ or $Ag_2Se$—$Ag_2Te$—$As_2Se_3$ glass.

6. The pseudo-reference electrode of claim 1, wherein the chalcogenide glass further comprises a germanium chalcogenide GeCh, wherein "Ch" denotes a chalcogen.

7. The pseudo-reference electrode of claim 6, wherein the chalcogenide glass is a $Ag_2Se$—GeSe or $Ag_2S$—GeS glass.

8. The pseudo-reference electrode of claim 1, wherein the chalcogenide glass further comprises a silver halide.

9. The pseudo-reference electrode of claim 8, wherein the silver halide is silver iodide or silver bromide.

10. The pseudo-reference electrode of claim 8, wherein the chalcogenide glass is a $Ag_2S$—$As_2S_3$—AgI or $Ag_2S$—$As_2S_3$—AgBr glass.

11. The pseudo-reference electrode of claim 1, wherein the chalcogenide glass is a $Ag_2S$—$As_2S_3$, $Ag_2S$—$Ag_2Se$, $Ag_2Se$—GeSe, $Ag_2S$—$As_2S_3$—AgI, $Ag_2S$—$As_2S_3$—AgBr, $Ag_2S$—GeS, or $Ag_2Se$—$Ag_2Te$—$As_2Se_3$ glass.

12. The pseudo-reference electrode of claim 1, wherein the chalcogen(s) is(are) selected from the group consisting of S, Se, and Te.

13. The pseudo-reference electrode of claim 1, wherein the silver halide in the halide glasses is silver fluoride, silver chloride, silver bromide, or silver iodide.

14. The pseudo-reference electrode of claim 1, wherein the halide glass comprises silver oxide and at least one other glass-forming oxide of metal/metalloid.

15. The pseudo-reference electrode of claim 14, wherein a silver oxide: other glass-forming oxide(s) of metal/metalloid molar ratio in the halide glass is from about 0.2-0.8 to about 0.8-0.2.

16. The pseudo-reference electrode of claim 1, wherein a silver halide: total glass-forming oxide(s) of metal/metalloid in the halide glass is from about 0.4:0.6 to about 0.7:0.3.

17. The pseudo-reference electrode of claim 1, wherein the glass-forming oxide(s) of metal/metalloid is(are) AgO, $P_2O_5$, $VO_3$, $CrO_2$, $SiO_2$, $SnO_2$, $PbO_2$, $MoO_4$, and/or $WO_4$.

18. The pseudo-reference electrode of claim 1, wherein the halide glass is:
$AgI_x(Ag_2O)_y(MoO_3)$;
$AgI_x(Ag_2O)_y(P_2O_5)_z$; or
$AgI_x(Ag_2O)_y(WO_3)$,
wherein x, y, and z are molar ratios, wherein x varies from about 0.4 to about 0.7, y varies from about 0.08 to about 0.56 and z varies from about 0.08 to about 0.56.

19. The pseudo-reference electrode of claim 1, wherein the composite comprises:
at least one chalcogenide glass or halide glass and binder, or
at least one chalcogenide glass or halide glass, a binder, and an electrically conductive carbon allotrope.

20. The pseudo-reference electrode of claim 1, wherein the silver conductor is supported on an electrically insulating substrate.

* * * * *